United States Patent
Morales

(10) Patent No.: US 8,159,712 B2
(45) Date of Patent: Apr. 17, 2012

(54) IMPOSITION ENHANCEMENTS TO SUPPORT DOCUMENTS WITH FOLD-OUT PAGES

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 914 days.

(21) Appl. No.: 12/191,106

(22) Filed: Aug. 13, 2008

(65) Prior Publication Data

US 2010/0039670 A1 Feb. 18, 2010

(51) Int. Cl.
*G06F 15/00* (2006.01)
*G06F 3/033* (2006.01)
(52) U.S. Cl. .......................................... 358/1.2; 715/803
(58) Field of Classification Search .................... 358/1.2, 358/1.18, 1.15, 1.9, 402, 448, 1.1; 715/803, 715/733, 234, 249; 345/634, 157, 629
See application file for complete search history.

(56) References Cited

U.S. PATENT DOCUMENTS

2008/0084574 A1* 4/2008 McDonald et al. .......... 358/1.15
* cited by examiner

*Primary Examiner* — Saeid Ebrahimi Dehkordy
(74) *Attorney, Agent, or Firm* — Richard H. Krukar; Kermit D. Lopez; Luis M. Ortiz

(57) ABSTRACT

A sheet resizing module operating in cooperation with an automatic imposition module provides for the automatic imposition of fold out sheets using an imposition template tailored for regular sized sheets. The imposition module can impose the pages of a document as if all the pages are regular sized. A sheet resizing module automatically adjusts the size of those sheets onto which fold out pages have been imposed. The sheet resizing module can employ a number of resizing rules to determine which of the sheet's four edges to move and how much to move them.

17 Claims, 5 Drawing Sheets

IMPOSITION ENHANCEMENTS TO SUPPORT DOCUMENTS WITH FOLD-OUT PAGES

TECHNICAL FIELD

Embodiments are related to printing processes. Embodiments are also related to the imposition of pages onto sheets, the sizes of sheets of print media and to automated imposition.

BACKGROUND

As is well known to those practiced in the printing arts, imposition is the positioning of pages onto sheets of media. In general, sheets are imposed along one of two routes. One route is fully automated but lacks the flexibility that is sometimes required for certain jobs. The other route is almost completely manual in which case flexibility is provided by a skilled operator.

Documents with fold out pages are a type of job often needing manual imposition by a skilled operator. The reason is that a fold out page is longer than the regular pages in a document. For example, the regular pages can be destined for an 8.5'×11' saddle stitched document. The regular pages can be printed onto 11"×17" sheets with two pages per sheet side and both sheet sides being printed. As such, the imposition is four pages per sheet. Automated current imposition programs can handle the regular page imposition.

The fold out pages, however, can not be printed using the same imposition as the regular pages. This is typically handled by using an exception sheet. An exception sheet is one requiring special handling. A skilled operator can impose the exception page in many ways.

FIG. 6 illustrates a sheet 601 printed with a fold-out page. The sheet 601 has one size 1 page 602 and one size 2 page 603. The size 1 page 602 is a regular page. The size 2 page 603 is a fold out page. A stitch line 604 indicates where the sheet can be folded and bound. A fold line 605 indicates where the fold out page is folded. When bound, a document is sized as if it contains only regular pages. The fold out page, however, can be folded out to reveal a larger page. The larger page is often used for graphics or illustrations.

Printers and printing engines are machines, often quite large, that apply ink patterns to the sheets. Many printers are also capable of folding and binding sheets as well. For example, a Xerox 4110 can print and then automatically fold the fold out page. Systems and methods for automatically imposing the regular pages and the fold out pages of a document are needed.

BRIEF SUMMARY

Aspects of the embodiments address limitations and flaws in the prior art by automatically changing the size of the imposed sheet, which is herein termed sheet resizing.

It is therefore an aspect of the embodiments that imposition templates guide the imposition of pages onto sheets. The each template guides the imposition of pages having a predefined size, size 1, onto sheets having a predetermined sheet size.

It is another aspect of the embodiments that a document specification includes a number of page specifications. Most of the pages are size 1 pages, but some of the pages are size 2 pages. The size 2 pages are fold-out pages.

It is a further aspect of the embodiments that an imposition module imposes the pages. The pages can be imposed as if every page is a size 1 page.

It is a yet further aspect of the embodiments that a sheet resizing module adjusts the size of the sheet onto which a size 2 page is imposed. The sheet's size is increased such that the size 2 page fits onto the sheet and is properly imposed.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION OF THE INVENTION

The particular values and configurations discussed in these non-limiting examples can be varied and are cited merely to illustrate embodiments and are not intended to limit the scope of the invention.

A sheet resizing module operating in cooperation with an automatic imposition module provides for the automatic imposition of fold out sheets using an imposition template tailored for regular sized sheets. The imposition module can impose the pages of a document as if all the pages are regular sized. A sheet resizing module automatically adjusts the size of those sheets onto which fold out pages have been imposed. The sheet resizing module can employ a number of resizing rules to determine which of the sheet's four edges to move and how much to move them.

Figure 1:
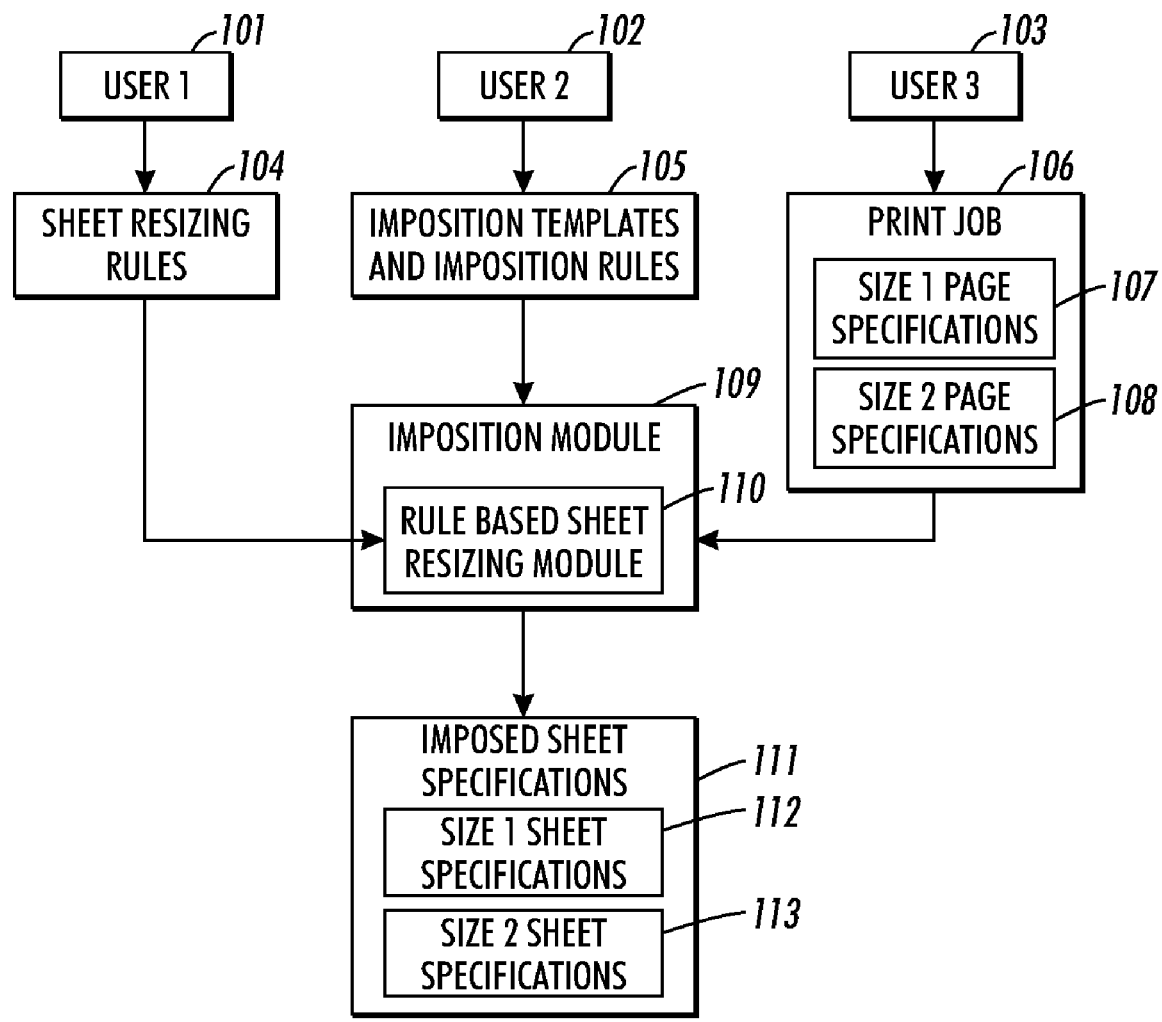
FIG. 1 illustrates a system that accepts and imposes print jobs having fold out sheets in accordance with aspects of the embodiments.

FIG. 1 illustrates a system that accepts and imposes print jobs having fold out sheets in accordance with aspects of the embodiments. A first user 101 can create or edit sheet resizing rules 104. A second user 102 can create imposition templates and imposition rules 105. A third user 103 can submit a print job 106 containing page specifications 107, 108. Clearly, the three users can be the same person, instead of different people performing each function. Most of the page specifications are size 1 page specifications 107 for regular pages. Some of the page specifications are size 2 page specifications 108 for fold out pages.

A printing facility can use a document specification to print a document that is composed of many pages. As such, document specifications typically contain many page specifications. Each page specification describes how a particular page is to be printed. An imposition module 109 uses the imposition templates and rules 105 to determine where on each of a number of sheets to print each page. The imposition module produces imposed sheet definitions 111 that can be printed and then later cut, folded, and bound to produce the document.

A rule based sheet resizing module 110 is illustrated as part of the imposition module 109 although it could well lie outside of the imposition module 109. The sheet resizing module 110 does not alter an imposed sheet specification containing only size 1 page specifications. It does, however, resize sheets having one or more size 2 pages. Resizing the sheet means altering the imposed sheet specification so that the printer prints onto a larger sheet such that the fold-out pages are properly printed. As such, the imposed sheet specifications 111 can include size 1 sheet specification 112 and size 2 sheet specifications 113. Printing a size 2 sheet specification 113 results in a printed sheet onto which containing a printed fold out page.

Figure 2:
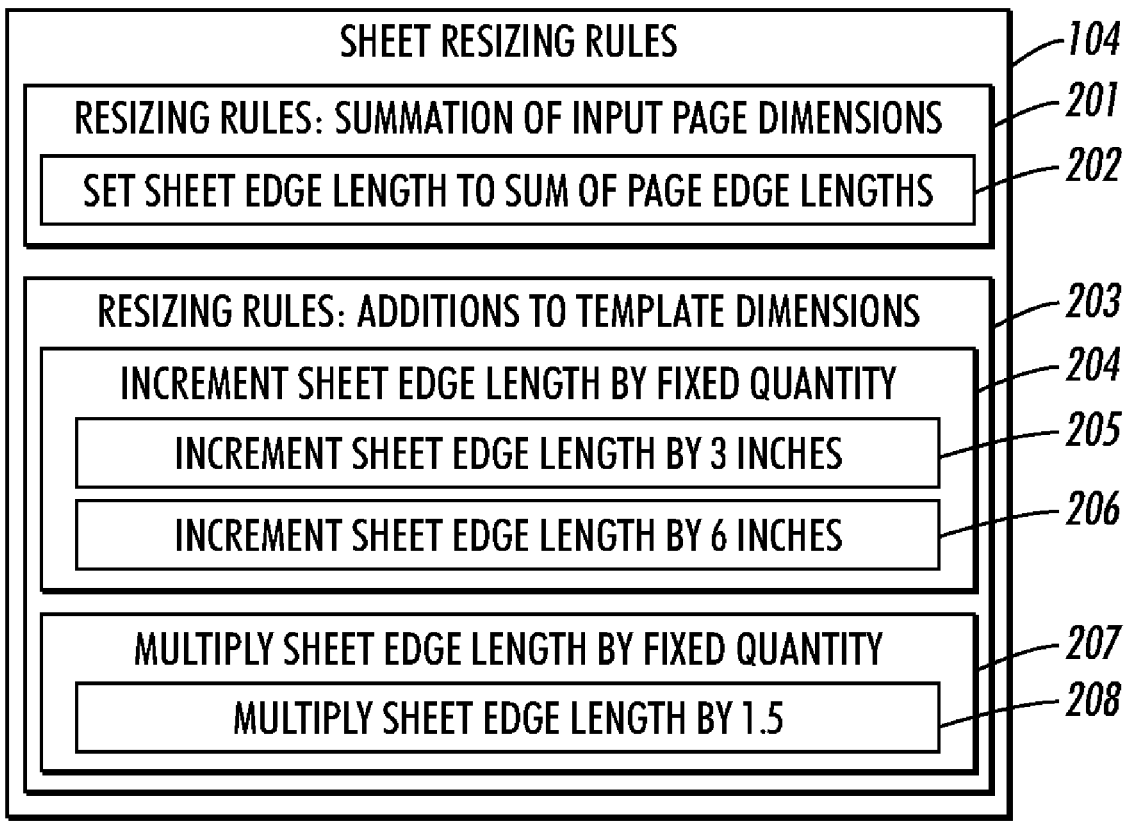
FIG. 2 illustrates sheet resizing rules in accordance with aspects of the embodiments.

FIG. 2 illustrates sheet resizing rules 104 in accordance with aspects of the embodiments. Some sheet resizing rules indicate that the input page dimensions be summed 201. For example, the sheet edge length can be set to the sum of the individual page edge lengths 202. As such, the resized sheet is dynamically resized to exactly fit the pages that are imposed onto it.

Alternatively, the resizing rules can simply increase a template dimension by a predetermined amount 203. A fixed quantity can be added 204 or the sheet edge length can be scaled by a multiple 207. Examples of adding a fixed quantity include incrementing the edge length by 3 inches 205 or by 6 inches 206. An example of scaling by a multiple is to multiply the sheet edge length by 1.5 208. The advantage of incrementing or scaling edge lengths by a predetermined quantity is that the resized sheet can be a known media size that is already loaded into a printer input tray. For example, a printer can have both 11"×17" and 11" by 20" sheets. Incrementing the 17" edge by 3" results in pulling media from a different tray without subsequent need for cutting the sheet to size.

Figure 3:
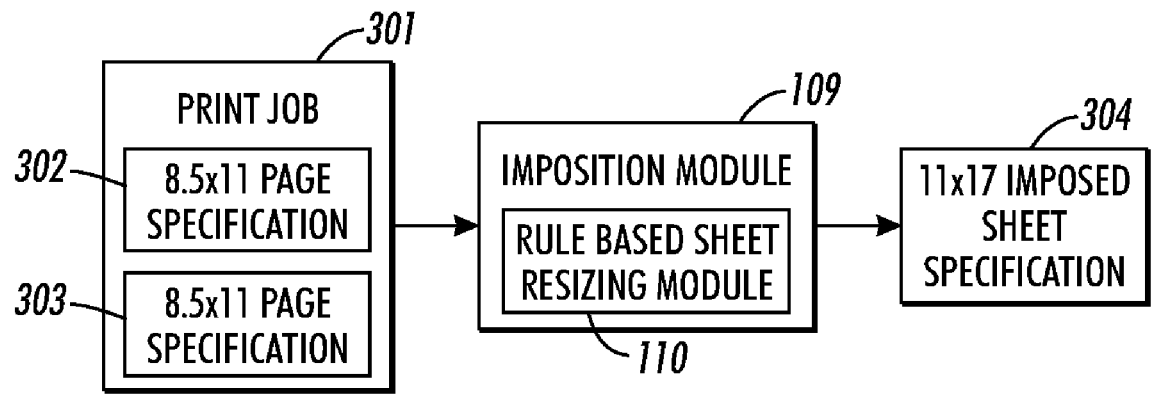
FIG. 3 illustrates regular pages being imposed in accordance with aspects of the embodiments.

FIG. 3 illustrates regular pages being imposed in accordance with aspects of the embodiments. A print job 301 has two 8.5×11 page specifications 302, 303. In accordance with an imposition template, the imposition module imposes the page specifications 302, 303 onto an 11×17 imposed sheet specification 304 and no resizing is needed.

Figure 4:
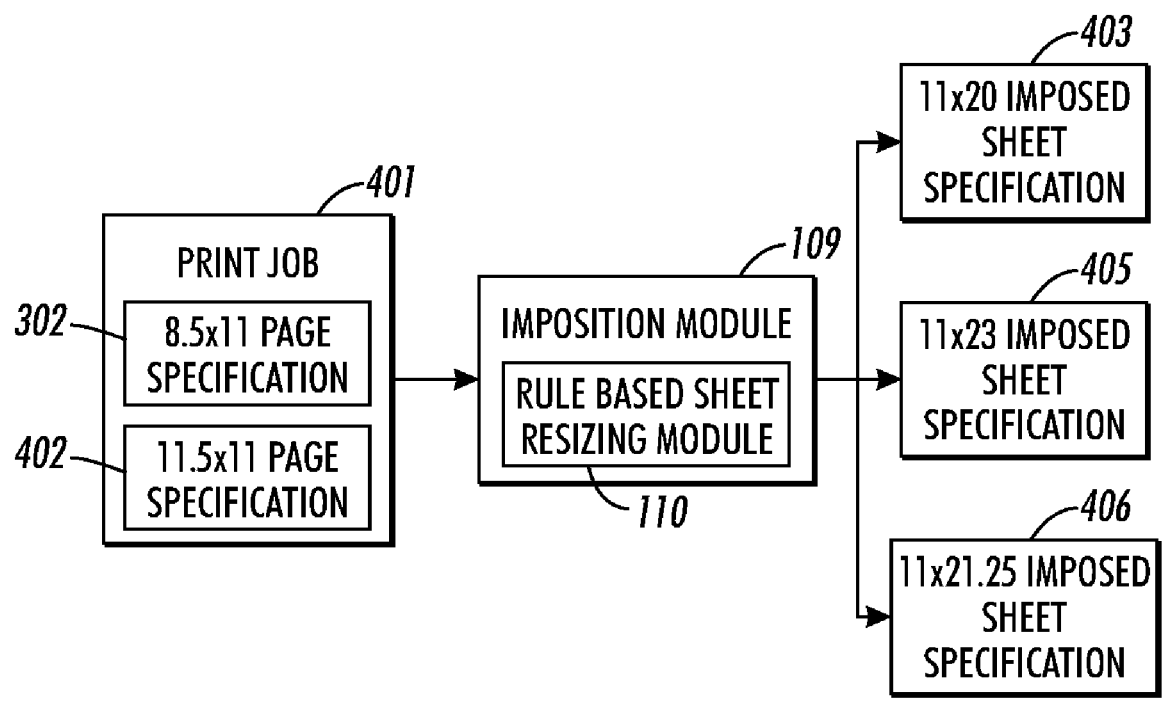
FIG. 4 illustrates a regular page and a fold out page being imposed in accordance with aspects of the embodiments.

FIG. 4 illustrates a regular page and a fold out page being imposed in accordance with aspects of the embodiments. A print job 401 has an 8.5×11 page specification 302 and an 11.5×11 page specification 402. The 11.5×11 page specification 402 is for the size 2, or fold out, page. The other page specification 302 is for the size 1, or regular, page. The imposition module 109 imposes the pages using the 11×17 template and the rule based resizing module 110 adjusts the sheet size to compensate for the size 2 page. An 11×20 imposed sheet specification 403 is produced by using either of two of the exemplary resizing rules: increment by 3 205; and sum edge lengths 202. The increment by 6 rule 206 results in an 11×23 imposed sheet specification 405. The multiply by 1.5 rule 208 results in an 11×21.25 imposed sheet specification 406.

Figure 5:
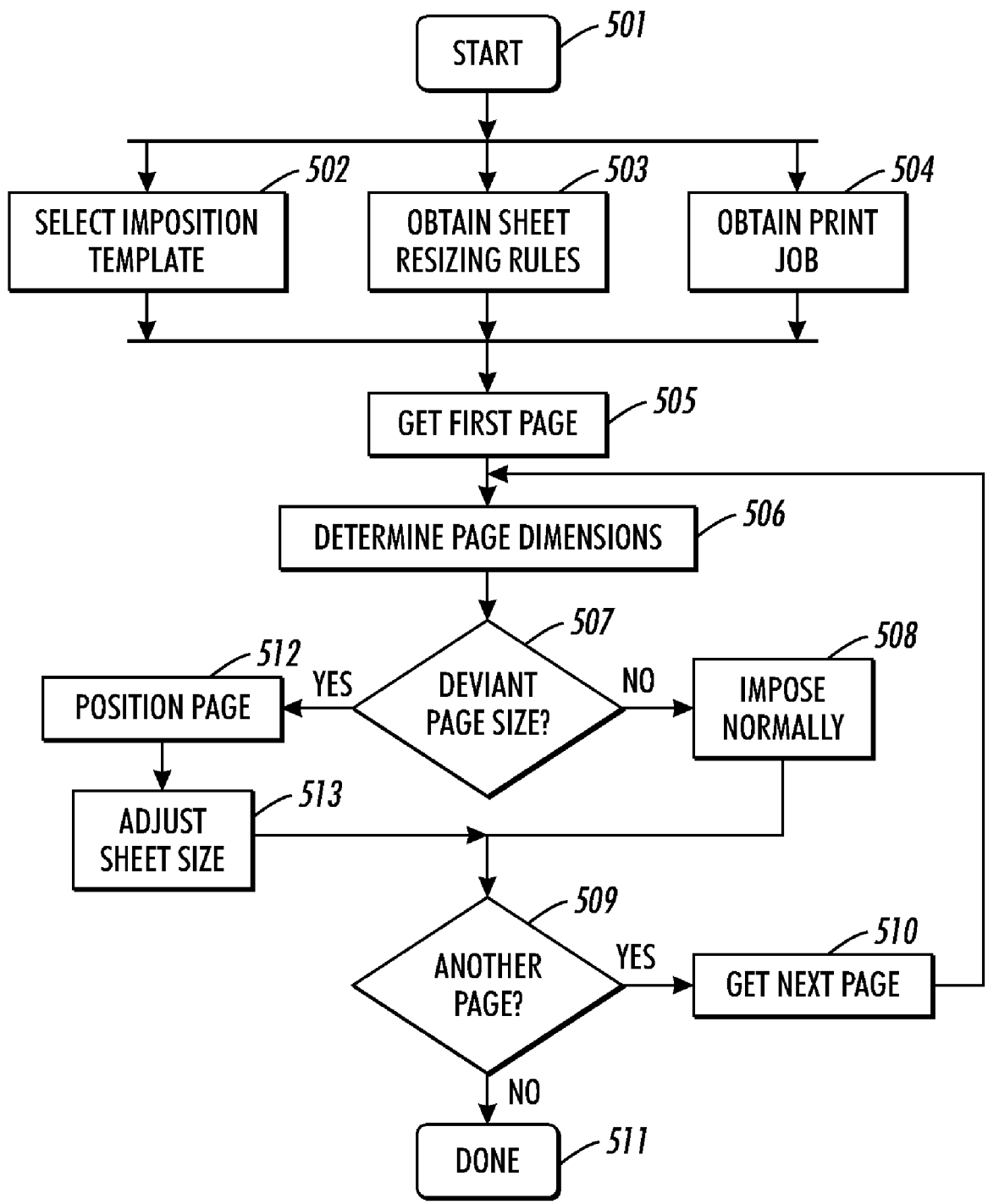
FIG. 5 illustrates a high level flow diagram of sheet resizing in accordance with aspects of the embodiments.
Figure 6:
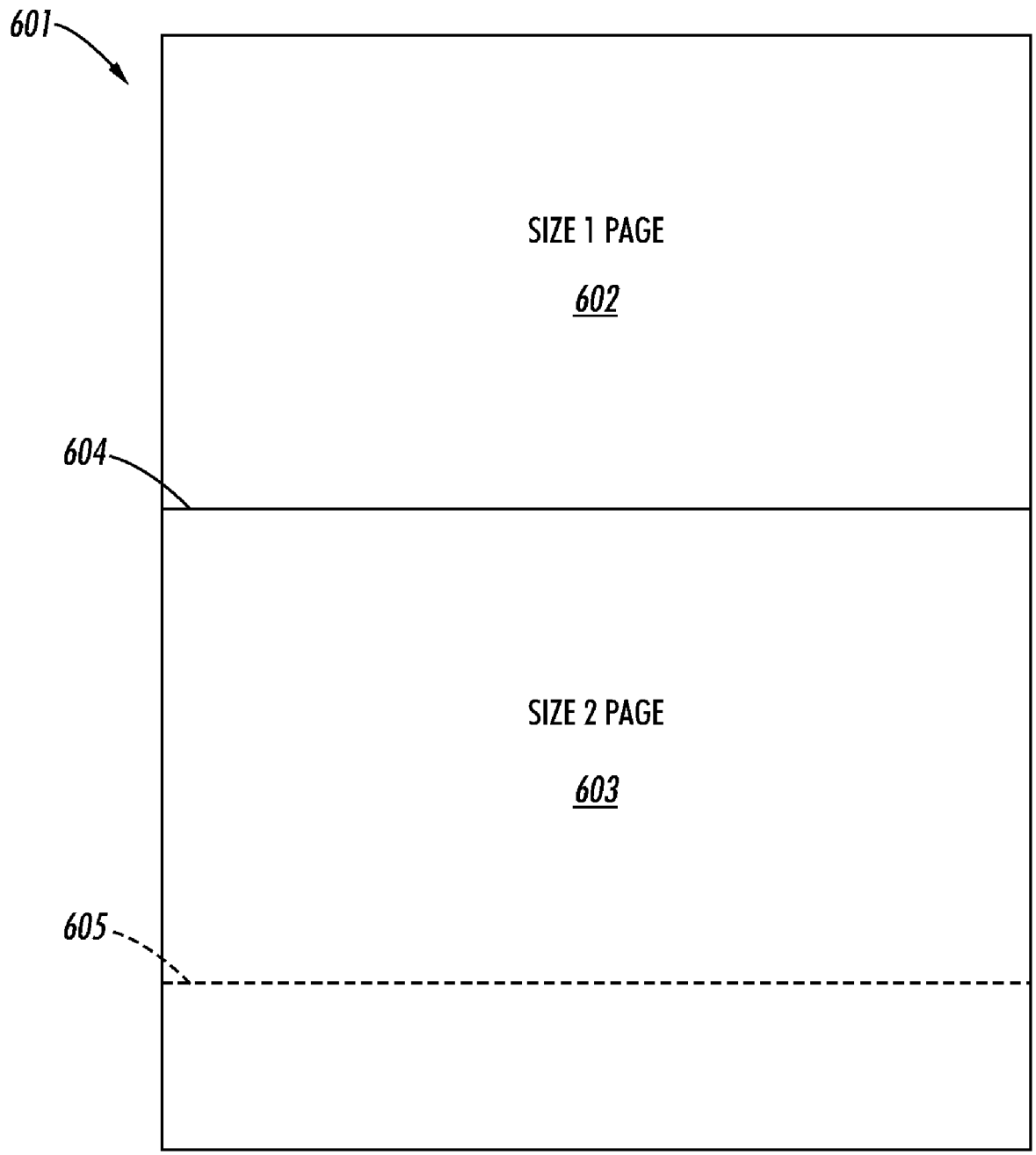
FIG. 6, labeled as prior art, illustrates a sheet having a regular page and a fold out page.

FIG. 5 illustrates a high level flow diagram of sheet resizing in accordance with aspects of the embodiments. After the start 501, a print job is obtained 504, sheet resizing rules are obtained 503, and an imposition template is selected 502. Next, the first page of the print job is gotten 505 and its dimensions determined 506. A deviant sized page is one having a size that does not match the page sizes in the selected imposition template. If the page is not of deviant size 507 then it is a regular size 1 page that is imposed normally. If it is of deviant size, then the page is positioned 512 and the sheet size adjusted 513. If any more pages remain 509, then the next is gotten 510 and the process loops back to determining page dimensions 506. Otherwise, the process is done 511. Note that this process resizes sheets as imposition occurs. Other implementations can specify different sizes for the sheets before imposition but require individual page size information to be available for each page imposed on each sheet before imposition starts. For example, the sheet impositions can include data specifying the locations and sizes of the imposed pages.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
an imposition template that guides the positioning of size 1 pages onto a sheet having a sheet size;
a sheet resizing module;
an imposition module; and
at least one sheet resizing rule wherein the sheet resizing module is a rule based sheet resizing module and wherein the at least one sheet resizing rule comprises a summation of input dimensions rule or comprises an addition to template dimensions rule or at least one sheet resizing rule is applied to each sheet edge;
wherein page specifications comprise at least one size 1 page specification describing at least one size 1 page and further comprising at least one size 2 page specification describing at least one size 2 page;
wherein the sheet resizing module adjusts the sheet size based on the sizes of the imposed pages to thereby automatically resize sheets such that the at least one size 2 page is properly imposed onto the sheet.

2. The system of claim 1 wherein the at least one sheet resizing rule comprises the summation of input dimensions rule.

3. The system of claim 2 wherein the summation of input dimensions rule directs that the sheet edge length be set to the sum of page edge lengths.

4. The system of claim 1 wherein the at least one sheet resizing rule comprises the addition to template dimensions rule.

5. The system of claim 4 wherein the addition to template dimensions rule directs that the sheet edge length be incremented by a fixed quantity.

6. The system of claim 4 wherein the addition to template dimensions rule directs that the sheet edge length be multiplied by a fixed quantity.

7. The system of claim 1 wherein at least one sheet resizing rule is applied to each sheet edge.

8. A method comprising:
- obtaining an imposition template that guides the positioning of size 1 pages onto sheets having a sheet size;
- obtaining a print job comprising at least two page specifications comprising a size 1 page description and a size 2 page description;
- determining page dimensions for the at least two page specifications;
- positioning the page specifications within an imposed sheet specification;
- adjusting the sheet size of the imposed sheet specification wherein a sheet resizing module determines the sheet size based on the positioning of the size 1 page description and of the size 2 page description; and
- at least one sheet resizing rule wherein the sheet resizing module is a rule based sheet resizing module and wherein one of the at least one sheet resizing rule is a summation of input dimensions rule or is an addition to template dimensions rule or is applied to each sheet edge.

9. The method of claim 8 wherein the at least one sheet resizing rule comprises the summation of input dimensions rule.

10. The method of claim 9 wherein the summation of input dimensions rule directs that the sheet edge length be set to the sum of page edge lengths.

11. The method of claim 8 wherein the at least one sheet resizing rule comprises the addition to template dimensions rule.

12. The method of claim 11 wherein the addition to template dimensions rule directs that the sheet edge length be incremented by a fixed quantity.

13. The method of claim 11 wherein the addition to template dimensions rule directs that the sheet edge length be multiplied by a fixed quantity.

14. The method of claim 8 wherein at least one sheet resizing rule is applied to each sheet edge.

15. A system comprising:
- an imposition template that guides the positioning of size 1 pages onto a sheet having a sheet size;
- an imposition module that produces an imposed sheet specification;
- a means for resizing the imposed sheet specifications such that size 3 pages are properly imposed onto the sheet; and
- at least one sheet resizing rule wherein the means for resizing the imposed sheet specifications is rule based.

16. The system of claim 6 wherein the at least one sheet resizing rule comprises a summation of input dimensions rule.

17. The system of claim 6 wherein the at least one sheet resizing rule comprises an addition to template dimensions rule.

* * * * *